United States Patent [19]

Bushbaum

[11] Patent Number: 4,970,809
[45] Date of Patent: Nov. 20, 1990

[54] LICENSE PLATE DISPLAY PANEL

[76] Inventor: William H. Bushbaum, 5622 195th Pl. East, Bonny Lake, Wash. 98390

[21] Appl. No.: 278,720

[22] Filed: Dec. 2, 1988

[51] Int. Cl.⁵ .............................................. G09F 7/00
[52] U.S. Cl. ...................................................... 40/209
[58] Field of Search ...................... 40/209, 152.1, 201, 40/202, 591, 611, 200, 206; 296/21

[56] References Cited

U.S. PATENT DOCUMENTS

| | | | |
|---|---|---|---|
| 1,363,893 | 12/1920 | Merkle | 40/206 |
| 2,280,558 | 4/1942 | Thompson | 40/200 |
| 2,624,966 | 1/1953 | Baumgartner | 40/209 |
| 4,314,417 | 2/1982 | Cain | 40/209 |

Primary Examiner—Cary E. Stone
Attorney, Agent, or Firm—Joan H. Pauly

[57] ABSTRACT

An integral molded plastic panel (20) includes a substantially vertical, forwardly facing mounting surface (22). The surface (22) is dimensioned to receive a plurality of license plates (16) and extends downwardly at least substantially to the bottom of the bumper (4) of a vehicle (2). The bumper (4) has a contoured downwardly and rearwardly sloping outer surface. Opposite sidewalls (34) extend substantially rearwardly from opposite side edge portions of the mounting surface (22) and terminate in rear edges (36) shaped to conform to the outer surface of the bumper (4) to facilitate airflow around the panel (20). A bottom wall (46) extends between the sidewalls (34) and rearwardly from the bottom of the mounting surface (22). The top of the panel (20) is attached to the bumper (4) by bolts (12) which attach the bumper (4) to a frame portion (14) of the vehicle (2). The bottom wall (46) carries mounting lugs (48) for attaching the bottom of the panel (20) to the bumper (4).

11 Claims, 2 Drawing Sheets

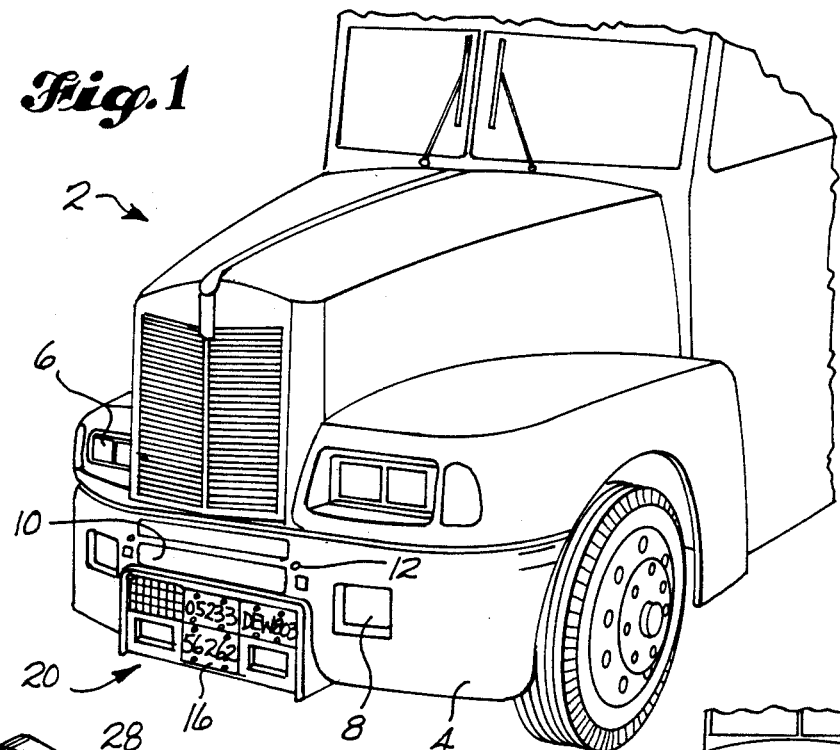
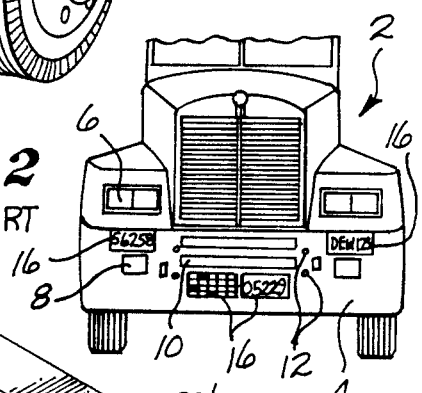
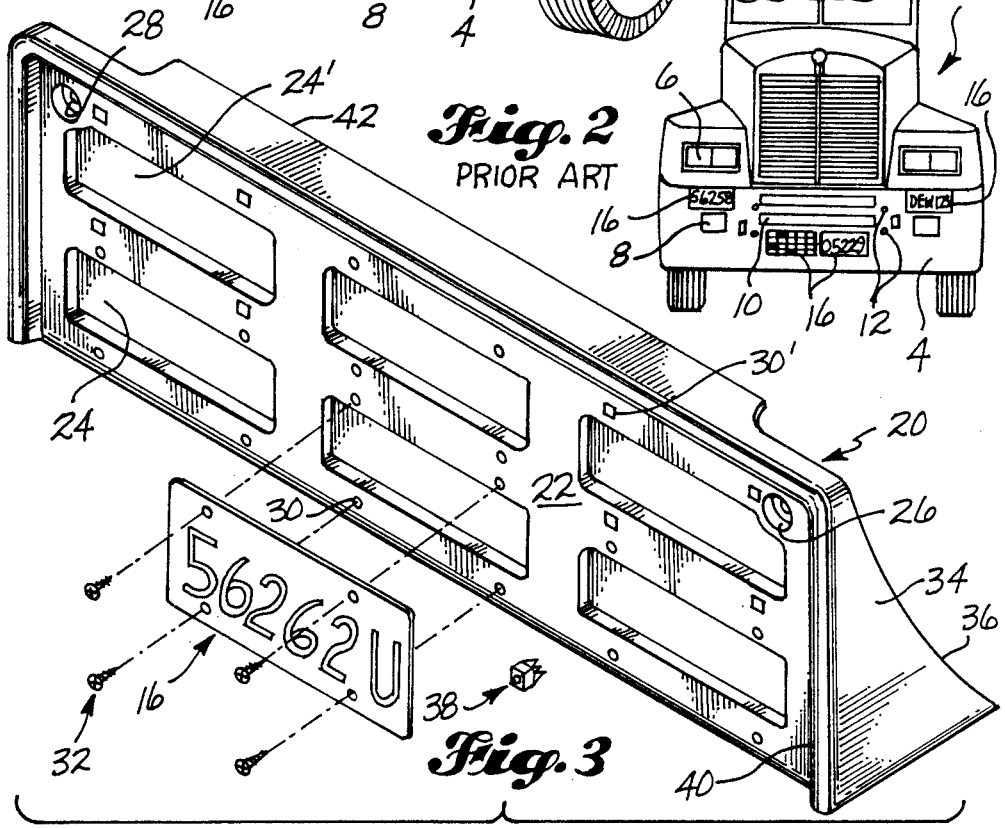

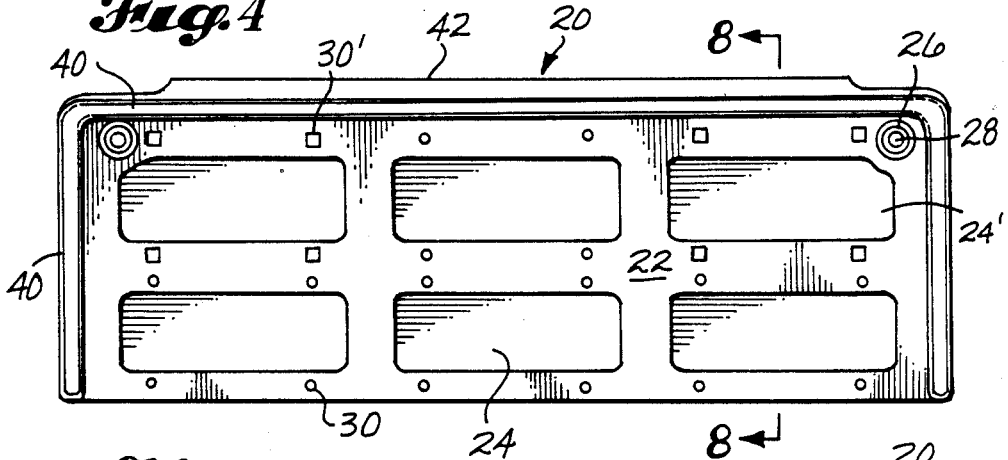
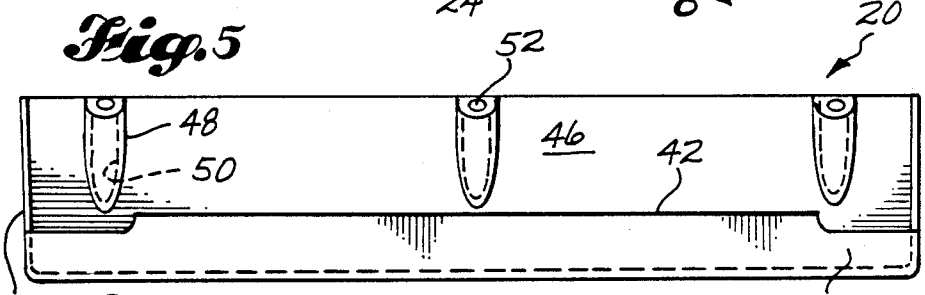
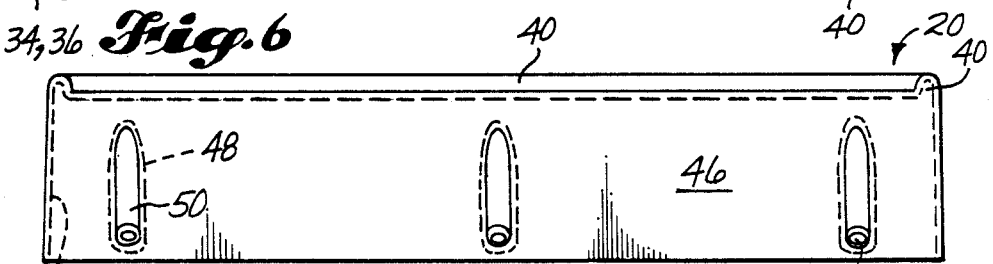
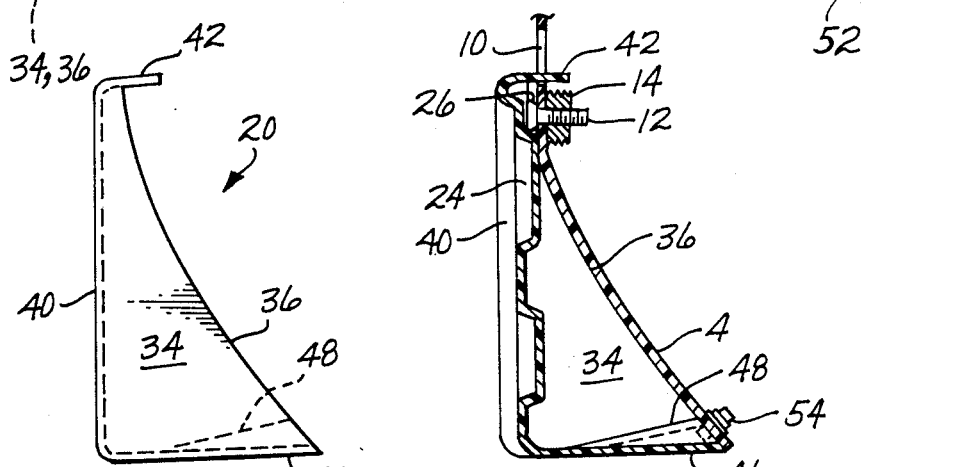

LICENSE PLATE DISPLAY PANEL

DESCRIPTION

1. Technical Field

This invention relates to license plate holders and display panels and, more particularly, to such a panel which has a vertical mounting surface dimensioned to receive a plurality of license plates, and opposite sidewalls extending rearwardly from the mounting surface and terminating in rear edges shaped to conform to the contoured downwardly and rearwardly sloping outer surface of a bumper.

2. Background Art

Heavy trucks commonly are regularly used in more than one state and, thus, are required to have a plurality of license plates. In a tractor trailer truck, the license plates are usually mounted on the front bumper of the tractor portion of the vehicle Some problems that have arisen in connection with this mounting arrangement are the lack of suitable space on the bumper for mounting all the required plates and the necessity for drilling holes and defacing the bumper in each of the scattered locations on which a plate is mounted.

These problems have been particularly troubling to owners and operators of newer model tractors which have molded plastic or elastomeric bumpers with contoured outer surfaces that slope downwardly and rearwardly on the lower portion of the bumper. The sloping contour of the lower portion of the bumper makes such lower portion unsuitable for directly mounting license plates. This severely limits the amount of space available on the bumper for mounting plates. In addition, the limited number of plates which can be mounted directly onto the bumper must be mounted in scattered locations, as shown in FIG. 2. The scattered mounting can be tedious to accomplish and is not generally acceptable to an owner of a new and well-cared-for vehicle since the mounting arrangement tends to mar the appearance of the vehicle. The scattered mounting also makes it difficult for an observer to quickly make note of the plates.

DISCLOSURE OF THE INVENTION

The subject of the invention is a license plate display panel for a vehicle of the type having a bumper with a contoured downwardly and rearwardly sloping outer surface. According to an aspect of the invention, the panel comprises a substantially vertical, forwardly facing mounting surface and opposite sidewalls. The mounting surface is dimensioned to receive a plurality of license plates and extends downwardly at least substantially to the bottom of the bumper. The sidewalls extend substantially rearwardly from opposite side edge portions of the mounting surface and terminate in rear edges shaped to conform to the contoured outer surface of the bumper to facilitate airflow around the panel and reduce drag.

The basic panel of the invention solves the problems discussed above. By providing a vertical mounting surface that extends substantially to the bottom of the bumper, the invention makes it possible to mount license plates in locations corresponding to the lower sloping portion of the bumper and thereby increases the space available for mounting plates. In most situations, the panel of the invention makes it possible to mount all the required plates on a single panel. This simplifies the mounting procedure and adds to the overall neatness and attractiveness of the vehicle. It also clearly displays each of the plates so that an observer can quickly and easily note all of the plates. The provision of the sidewalls with rear edges that conform to the bumper allows this clear and orderly mounting arrangement to be accomplished without creating any significant undesirable drag around the bumper and display panel.

The panel may be made from a variety of materials. Preferably, the panel is made from molded plastic. Use of molded plastic simplifies the manufacture of the panel, makes the panel aesthetically compatible with the molded bumpers of modern tractors, allows the weight of the panel to be minimized, and maximizes the durability and minimizes the maintenance of the panel. The walls of the molded plastic panel may be relatively thin and preferably have means for reinforcing them. In the preferred embodiment, a reinforcing rounded ridge projects forwardly from the top and side edges of the mounting surface. For further reinforcement, the mounting surface includes a plurality of forwardly facing reinforcing recesses positioned to be covered by license plates attached to the mounting surface. In addition to providing structural reinforcement, the ridge and any recesses not covered by plates add to the aesthetic appearance of the panel. The recesses also facilitate the proper positioning and alignment of the plates on the panel. Preferably, the panel is dimensioned to receive two aligned horizontal rows of plates, and the recesses are correspondingly aligned in two horizontal rows.

The attaching of the display panel to the bumper may be accomplished in various ways. Preferably, the panel is dimensioned to make use of existing bolts that attach the bumper to frame portions of the vehicle. In the preferred embodiment of the panel, the mounting surface is dimensioned to allow a top portion thereof to be attached to the bumper by means of such existing bolts.

A preferred feature of the panel is the provision of a bottom wall and a plurality of mounting lugs carried by the bottom wall. The bottom wall extends substantially rearwardly from a bottom portion of the mounting surface and laterally between the sidewalls. The lugs attach the panel to a lower portion of the bumper. In the preferred embodiment, the combination of this mounting lug arrangement and the preferred attachment of the top portion described above provides a secure attachment to the bumper which is easy to accomplish and minimizes any required additional holes in the bumper.

Another preferred feature of the invention, which is provided for use in connection with bumpers having a suitably positioned air intake opening, is a lip that projects substantially rearwardly from a top edge of the panel. The lip is positioned to be received into a lower portion of the intake opening. This arrangement helps maximize the aerodynamic and aesthetic integration of the panel into the bumper structure without blocking the intake opening. The arrangement also contributes to the maximization of the area of the mounting surface and thereby helps maximize the number of plates which the panel can receive. In the preferred embodiment, the lip projects substantially rearwardly from a top edge of the reinforcing ridge.

These and other advantages and features will become apparent from the detailed description of the best mode for carrying out the invention that follows.

BRIEF DESCRIPTION OF THE DRAWINGS

In the drawings, like element designations refer to like parts throughout and:

FIG. 1 is a pictorial view of a front portion of a tractor on which the preferred embodiment of the panel is mounted.

FIG. 2 is a front elevational view of the tractor shown in FIG. 1 illustrating a previous license plate mounting arrangement.

FIG. 3 is an exploded pictorial view of the preferred embodiment of the panel and a license plate.

FIG. 4 is a front elevational view of the panel shown in FIG. 3.

FIG. 5 is a top plan view of the panel shown in FIGS. 3 and 4 taken from a viewpoint essentially parallel to the mounting surface.

FIG. 6 is like FIG. 5 except that it shows a bottom plan view of the panel.

FIG. 7 is a side elevational view of the panel shown in FIGS. 3–6.

FIG. 8 is a sectional view taken along the line 8—8 in FIG. 4 and including a portion of the bumper to illustrate the manner of attaching the panel.

BEST MODE FOR CARRYING OUT THE INVENTION

The drawings show a panel 20 that is constructed according to the invention and that also constitutes the best mode for carrying out the invention currently known to the applicant. FIG. 1 shows the panel 20 mounted on the front bumper 4 of the tractor portion 2 of a heavy truck. It is anticipated that a primary application of the panel of the invention will be its use for mounting license plates on the front bumper of the type of tractor 2 shown in FIG. 1. However, it is of course to be understood that the panel of the invention may also be used to advantage on other types of tractors and other types of vehicles and that the panel may be mounted on rear as well as front bumpers.

The tractor 2 shown in FIGS. 1 and 2 is a Kenworth (Trademark) Model T600A. The present preferred embodiment of the panel 20 shown in the drawings is designed specifically for use with this type of tractor 2. The tractor 2 has a number of conventional features. Main headlights 6 are positioned on the fenders above the front bumper 4. Auxiliary front lights 8 are mounted in suitable openings in the bumper 4. Two vertically aligned air intake openings 10 extend horizontally along the midportion of the bumper between the auxiliary lights 8. As shown in FIG. 2, four bolts 12 are positioned around the lower intake opening 10 for attaching the bumper 4 to a frame portion 14 (FIG. 8) of the tractor 2. The bumper 4 has a unitary construction with a contoured outer surface that slopes downwardly and rearwardly. The slope of the surface is most pronounced along the lower portion of the bumper 4 below the connections to the frame portion 14.

The terms "forwardly", "rearwardly", and the like are used herein to facilitate the description of the panel of the invention. These terms refer specifically to the relative positions of the panel and vehicle illustrated in FIG. 1, in which the panel 20 is mounted on a front bumper 4. Their use is not intended to limit the scope of the invention to a panel mountable on a front bumper. It is intended to be understood that the panel could also be mounted on a rear bumper, in which case the "forward" and "rearward" directions would be the reverse of the common usage of these terms.

FIG. 2 illustrates an arrangement of license plates 16 that has previously been used for mounting a plurality of plates 16 on the bumper 4. Because of the various openings in the bumper 4 and the downwardly and rearwardly sloping outer contour of the lower portion of the bumper 4, the available space and positions for mounting license plates 16 are limited. A single plate is mounted above each of the auxiliary lights 8. In addition, two horizontally adjacent plates 16 are mounted below the lower air intake opening 10. This arrangement of four plates 16 represents the practical limit on the number of plates 16 which may be mounted on the bumper 4 using conventional plate holders.

As discussed above, the panel 20 of the invention increases the total area available for mounting plates 16 on the bumper 4 and allows a plurality of plates 16 to be mounted in a neat configuration at a single location on the bumper 4. The preferred embodiment of the panel 20 shown in the drawings can receive up to six license plates 16. In FIG. 1, four plates 16 are shown attached to the panel 20. The configuration of the four mounted plates 16 shown in FIG. 1 is only one of the several possible configurations of four plates 16 on the panel 20 which produces an attractive orderly appearance and clearly displays each of the four plates 16.

Referring to FIGS. 1, 3, and 4, the preferred embodiment of the panel 20 includes a substantially vertical, forwardly facing mounting surface 22. The mounting surface 22 is dimensioned to receive six standard size license plates 16. The surface 22 extends downwardly from the lower edge of the lower air intake opening 10 substantially to the bottom of the bumper 4.

The panel 20 also includes opposite sidewalls 34, best seen in FIGS. 1, 3, 7, and 8. The panel 20 is an integral molded plastic body made from a material such as ABS plastic. The sidewalls 34 extend substantially rearwardly from a rounded ridge 40 that borders the top and side edges of the mounting surface 22, as described further below. The sidewalls 34 extend from opposite side edge portions of the mounting surface 22 formed by the ridge 40. The sidewalls 34 terminate in rear edges 36 that are contoured and shaped to conform to the contoured outer surface of the bumper 4. This fitting together of the outer surface of the bumper 4 and the rear edges 36 of the panel sidewalls 34 facilitates airflow around the panel 20 when the tractor 2 is being operated and, thus, reduces drag around the panel 20. The sloping bumper outer surface and rear edges 36 may be curved, as shown in FIGS. 1, 3, 7, and 8, or they may be linear, or a combination of curved and linear, without departing from the scope of the invention.

As noted above, the panel 20 is a single integral molded plastic body. In order to minimize the weight of the panel 20, it is desirable to minimize the thickness of the walls of the panel 20. In order to accomplish the minimization of weight and at the same time provide a high degree of strength in the panel 20, the panel 20 is provided with reinforcing means. Such means includes the ridge 40 mentioned above. The ridge 40 has a rounded outer surface and projects forwardly from the top and side edges of the mounting surface 22. This configuration of the ridge 40 creates an attractive frame effect around the mounting surface 22, provides a relatively low drag curved peripheral surface of the panel 20, and gives the panel 20 substantial structural strength The ridge 40 extends forwardly a short distance from the mounting surface 22 and rearwardly therefrom a corresponding distance The sidewalls 34 are integral rearward continuations of the side portions of the ridge 40.

The reinforcing means of the panel 20 also includes a plurality of forwardly facing recesses 24, 24' formed in the mounting surface 22. The number and positions of the recesses 24, 24' correspond to the mounting positions for license plates 16 on the mounting surface 22. Each recess 24, 24' is positioned to be covered by a license plate 16 attached to the mounting surface 22 at the corresponding location. The recesses 24, 24' are arranged in two aligned horizontal rows of recesses 24, 24', with three recesses 24, 24' in each row. This arrangement of the recesses 24, 24' allows the maximization of the reinforcement they provide, permits the maintenance of a continuous mounting surface 22 around the recesses 24, 24' to maximize utilization of the mounting surface area for receiving license plates 16, helps guide placement of the license plates 16 on the mounting surface 22, and contributes to the overall attractive appearance of the panel 20.

With the exception of the recesses 24' in the upper corners of the panel 2, each of the recesses 24 has a generally rectangular configuration The recesses 24' in the upper corners have truncated upper corner portions to accommodate insets 26 for receiving mounting bolt heads, as described further below. The holes 30 for receiving bolts 32 to mount plates 16 on the mounting surface 22 at mounting locations corresponding to recesses 24 may be preformed in the mounting surface 22. Alternatively, the holes 30 may be omitted and drilled, at the time of mounting the plates 16, in precise alignment with the holes in the plates 16, or the holes 30 may be partially formed as a guide to mounting the plates 16. The partial forming of the holes 30 is advantageous since it helps maximize the secure engagement of the bolts 32 with the molded plastic panel 20 and at the same time guides precise positioning of the plates 16. The plate mounting holes 30' around the two modified recesses 24' in the upper corners of the panel 20 are preferably preformed. Also preferably, a molded plastic nut of a conventional type, such as the nut 38 shown in FIG. 3, is prepositioned in each of the modified holes 30'. The nuts 38 allow easy mounting of the two upper corner license plates 16 after the panel 20 has been secured to the bumper 4, as described further below. Threaded inserts made from a material such as brass may be provided instead of the nuts 38. Such inserts have the advantage of allowing plates 16 to be mounted and removed repeatedly without stripping the threads on the inserts.

Panels constructed according to the invention may be attached to vehicle bumpers in various ways. The preferred mounting arrangement for the tractor 2 shown in FIGS. 1 and 2 is illustrated in FIGS. 3-8. The mounting surface 22 is dimensioned to allow a top portion thereof to be attached to the bumper 4 by means of the existing frame bolts 12 described above. To accommodate the heads of the bolts 12, each upper corner of the mounting surface 22 has a round inset 26 formed therein. A hole 28 extends horizontally through the inner forwardly facing wall of each inset 26. The use of the existing bumper mounting bolts 12 and the attachment of the upper portion of the panel 20 to the frame 14 as well as the bumper 4 simplify the panel mounting procedure and provide a secure attachment of the panel 20 to the bumper 4.

It is preferable to attach the bottom portion of the panel 20 to the bumper 4 as well as the top portion. For the purpose of facilitating such attachment of the bottom portion, and for the purposes of strengthening the panel structure and further reducing drag, the panel 20 has a bottom wall 46. The bottom wall 46 is shown in FIGS. 5-8. It extends substantially rearwardly from the bottom edge of the mounting surface 22 and laterally between the sidewalls 34. The integral attachments of the bottom wall 46 to the mounting surface 22 and the sidewalls 34 are rounded to avoid sharp edges and facilitate airflow around the panel 20. A plurality of mounting lugs 48 are carried by, and are preferably integrally formed with, the bottom wall 46. In the preferred embodiment, there are three mounting lugs 48 spaced as shown in FIGS. 5 and 6. Each lug 48 has a rounded upper surface that projects upwardly from the inner surface of the bottom wall 46. The lower portion of the lug 48 forms a rounded forwardly tapering slot 50 that opens onto the bottom surface of the bottom wall 46. A hole 52 is formed in the sloping rear wall of the lug 48 for receiving a nut and bolt assembly 54 to attach the lower portion of the panel 20 to the bumper 4.

The panel 20 preferably is provided with the additional feature of an upper lip 42. The lip 42 projects substantially rearwardly, slightly upwardly, from a top edge of the panel 20. In the preferred embodiment, the lip 42 projects integrally from the rear edge of the top portion of the rounded reinforcing ridge 40. The lip 42 is positioned to be received into the lower edge portion of the lower air intake opening 10, as shown in FIGS. 1 and 8. This arrangement maximizes the use of available space for mounting license plates 16 while maintaining the low drag characteristics of the panel 20 and avoiding obstruction of or interference with the functioning of the air intake opening 10.

The procedure for mounting the panel 20 on the bumper 4 and for mounting license plates 16 on the panel 20 is as follows. A license plate 16 may be mounted on any one, some, or all of the license plate mounting locations on the panel 20, except the two upper corner locations, before the panel 20 is attached to the bumper 4. This is accomplished by attaching each plate with four bolts 32 at the locations 30 and securing each bolt 32 with a standard nut. The license plates on the upper corners must be mounted after the panel 20 has been attached to the bumper 4 since the bolt head insets 26 must remain accessible for accomplishing the mounting of the panel 20.

The mounting of the panel 20 is initiated by removing the two lower existing bumper mounting bolts 12. The panel 20 is then positioned relative to the bumper 4, as shown in FIG. 1, and the bolts are reinserted and tightened to secure the bumper 4 to the frame portion 14, and the panel 20 to the bumper 4 and the frame portion 14, as shown in FIG. 8. Preferably, a suitable washer is positioned on each side of each hole 28. After the top portion of the panel 20 has been secured by means of the bolts 12, three holes are drilled in the bottom portion of the bumper 4 in alignment with the holes 52 in the mounting lugs 48, using the tapered slots 50 as guides for the drilling operation. Following drilling of the holes, the bottom portion of the panel 20 is secured to the bumper 4 by means of standard nut and bolt assemblies 54, as shown in FIG. 8.

After the panel 20 has been secured to the bumper 4, or more specifically after the upper portion of the panel 20 has been secured by means of the bolts 12, license plates 16 may be mounted in the locations corresponding to the modified recesses 24', if desired. This is accomplished simply by aligning the mounting holes in the plates 16 with the prepositioned nuts 38 and tightening a bolt through each of the license plate holes and the corresponding nut 38. If fewer than six plates are to be mounted, the choice of the exact configuration of the plates 16 on the panel 20 is a matter of the personal preference of the operator. Whatever choice is made, the plates 16 present a neat appearance and are clearly displayed at a single location to make them readily apparent at a glance to an observer.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A license plate display panel for a vehicle of the type having a bumper with a contoured downwardly and rearwardly sloping outer surface, said panel comprising:
    a substantially vertical, forwardly facing mounting surface dimensioned to receive a plurality of license plates and extending downwardly at least substantially to the bottom of the bumper;
    opposite sidewalls extending substantially rearwardly from opposite side edge portions of said mounting surface and terminating in rear edges shaped to conform to said contoured outer surface of the bumper to facilitate airflow around the panel and reduce drag; and
    laterally extending portions extending laterally between top edge portions of said sidewalls and shaped and positioned to be closely adjacent to the bumper to further facilitate airflow around the panel and reduce drag.

2. The panel of claim 1, in which the panel is made from molded plastic and has a reinforcing rounded ridge projecting forwardly from the top and side edges of said mounting surface and forming outer peripheral surface portions of the panel.

3. The panel of claim 2, comprising a lip projecting substantially rearwardly from a top edge of said ridge, said lip being positioned to be received into a lower portion of an air intake opening in the bumper.

4. A license plate display panel for a vehicle of the type having a bumper with a contoured downwardly and rearwardly sloping outer surface, said panel comprising:
    a substantially vertical, forwardly facing mounting surface dimensioned to receive a plurality of license plates, in two aligned rows of plates, and extending downwardly at least substantially to the bottom of the bumper; and
    opposite sidewalls extending substantially rearwardly from opposite side edge portions of said mounting surface and terminating in rear edges shaped to conform to said contoured outer surface of the bumper to facilitate airflow around the panel and reduce drag;
    in which the panel is made from molded plastic, and said mounting surface includes a plurality of forwardly facing reinforcing recesses positioned to be covered by license plates attached to said mounting surface, said recesses being arranged in two aligned horizontal rows of recesses corresponding to said aligned rows of plates to facilitate proper positioning and alignment of said plates.

5. The panel of claim 4, in which the panel includes a reinforcing rounded ridge projecting forwardly from the top and side edges of said mounting surface and forming outer peripheral surface portions of the panel.

6. A license plate display panel, for a vehicle of the type having a bumper with a contoured downwardly and rearwardly sloping outer surface, said panel comprising:
    a substantially vertical, forwardly facing mounting surface dimensioned to receive a plurality of license plates and extending downwardly at least substantially to the bottom of the bumper; and
    opposite sidewalls extending substantially rearwardly from opposite side edge portions of said mounting surface and terminating in rear edges shaped to conform to said contoured outer surface of the bumper to facilitate airflow around the panel and reduce drag;
    in which said sidewalls are shaped to position a portion of said mounting surface closely adjacent to existing bolts that attach the bumper to frame portions of the vehicle to facilitate attachment of the panel to the bumper by means of said bolts.

7. The panel of claim 6, comprising a lip projecting substantially rearwardly from a top edge of the panel, said lip being positioned to be received into a lower portion of an air intake opening in the bumper.

8. A license plate display panel for a vehicle of the type having a bumper with a contoured downwardly and rearwardly sloping outer surface, said panel comprising:
    a substantially vertical, forwardly facing mounting surface dimensioned to receive a plurality of license plates and extending downwardly at least substantially to the bottom of the bumper;
    opposite sidewalls extending substantially rearwardly from opposite side edge portions of said mounting surface and terminating in rear edges shaped to conform to said contoured outer surface of the bumper to facilitate airflow around the panel and reduce drag;
    a bottom wall extending substantially rearwardly from a bottom portion of said mounting surface and laterally between said sidewalls; and
    a plurality of mounting lugs carried by said bottom wall for attaching the panel to a lower portion of the bumper.

9. The panel of claim 8, in which said mounting surface is dimensioned to allow a top portion thereof to be attached to the bumper by means of existing bolts that attach the bumper to frame portions of the vehicle.

10. The panel of claim 9, comprising a lip projecting substantially rearwardly from a top edge of the panel, said lip being positioned to be received into a lower portion of an air intake opening in the bumper.

11. The panel of claim 8, comprising a lip projecting substantially rearwardly from a top edge of the panel, said lip being positioned to be received into a lower portion of an air intake opening in the bumper.

* * * * *